Patented Oct. 14, 1952

2,614,092

UNITED STATES PATENT OFFICE 2,614,092

INFUSIBLE COPOLYMERIC VINYLIDENE CHLORIDE COMPOSITION

John H. Reilly, Midland, Mich., assignor to The Dow Chemical Company, Midland, Mich., a corporation of Delaware No Drawing. Application August 20, 1945, Serial No. 611,703

6 Claims. (Cl. 260—41)

This invention relates to compositions containing certain of the copolymers of vinylidene chloride with acrylonitrile. It concerns more particularly such compositions which contain an agent capable of promoting the conversion of the normally thermoplastic copolymers to an infusible state. The invention is further concerned with methods of compounding such compositions and treatments for converting the compositions from the thermoplastic to the infusible condition.

Reference is made to United States Letters Patent 2,238,020, which describes and claims broadly the copolymers with which the present invention is particularly concerned. Such copolymers may be prepared by polymerizing together monomeric vinylidene chloride and monomeric acrylonitrile in desired proportions. The polymerization may be effected at temperatures ranging from about room temperature up to about 90° C. under the vapor pressure of the reactants. A convenient temperature range is from 30° to 60° C. The polymerization rate can be accelerated by carrying out the reaction in the presence of catalysts, such as benzoyl peroxide, hydrogen peroxide etc., or, by subjecting the monomer mixture to the effect of light, or to the combined effects of light, catalysts, and heat.

I have found that these copolymers, in a certain relatively small part of the total range of proportions, possess the unexpected property of being convertible to an infusible state by the use of suitable curing agents. This range of proportions is fairly narrow, the optimum weight percentage being between about 12 and about 18 per cent of acrylonitrile. The range may be slightly broader than this, for example, I have been able partially to convert the copolymer containing approximately about 10.6 or about 19.2 per cent by weight of acrylonitrile to the infusible state. The ternary and quaternary copolymers of vinylidene chloride with acrylonitrile in the proportions above given with minor amounts of polymerizable substances such as vinyl chloride, vinyl acetate, styrene, the esters of acrylic or methacrylic acids, allyl and related esters of carboxylic or inorganic acids, unsaturated ethers etc., are likewise capable of use according to my invention.

The procedure which I have discovered and perfected for the conversion of the aforesaid copolymers from their normally thermoplastic condition to the infusible state broadly includes the compounding of the copolymers in a suitable formulation and subjecting the composition to a time-temperature treatment which produces the desired result. While I cannot state positively a theory for the mechanism of the reaction involved, I believe a cross-linking of the long-chain polymers occurs which renders the composition non-thermoplastic.

The essential ingredients of the composition are the normally thermoplastic copolymer, containing acrylonitrile in the proportions above set forth, a plasticizer, and a curing agent. As herein used, the term "curing agent" means a substance which is capable of causing the conversion of the normally thermoplastic copolymer to an infusible state. The "curing agents" of this invention are organic and inorganic nitrogen bases, or nitrogen compounds which have a basic reaction at curing temperatures, and which, in any case, have dissociation constants (K) greater than $10^{-10}$. It has been found that the existence of an amino group in an organic compound is not assurance, of itself, that the compound will serve as a curing agent, but that nitrogen compounds having dissociation constants between $10^{-10}$ and $10^{-3}$ are effective, and that those with dissociation constants in the range $10^{-6}$ to $10^{-4}$ are the most practical, both as to rate of reaction and extent of "cure." In the following list of compounds which have been used as curing agents, the effectiveness of the compound has been found to vary with the dissociation constant, in the manner above indicated. Thus, aniline ($K 4.6 \times 10^{-10}$), the amino acids, and acetamide ($K 3.1 \times 10^{-15}$) are not suitable for this use, pyridine ($K 2.3 \times 10^{-9}$) is useful, but slow, and the compounds listed below are highly effective: ethylene diamine, the alkanolamines (including triethanolamine, propanolamine, etc.), the alkylamines (including the mono-, di- and trimethyl, ethyl, propyl, butyl and amyl amines) alpha-picoline, piperidine, triethylene tetramine, ammonium citrate, ammonium carbonate, ammonium sulfate, ammonium acetate, ammonium hydroxide, and that type of condensation product of aldehydes with nitrogenous bases, which has been found useful as rubber accelerators, including, for example, the butyraldehyde-aniline condensate furnished (by The Naugatuck Chemical Company) under the trade-name "Beutene." Compounds other than the ones named, including the various members of suggested classes of amines and other nitrogen bases, may be used, so long as they meet the stated requirements as to dissociation constant. The amount of curing agent to be employed may vary between about 0.005 and about 0.06 part per part of the copolymer, and is generally from 0.01 to 0.035 part per part of copolymer.

The composition may, and preferably does, contain an accelerator, such as litharge, which promotes the rate of effectiveness of the curing agent in producing the conversion in the state of the copolymer. Fillers and pigments or other modifying agents which do not interfere unduly with the curing of the copolymer may be included to produce effects such as desired colors, hardness, increased tensile strength, varying elongations etc., and to lower the cost of the finished articles.

The compounding of the composition may conveniently be carried out by mixing together the powdered copolymer and filler, accelerator, or other modifying agent, in any of the usual types of mixing machines, such as a Banbury mixer. After such materials have been thoroughly commingled, the plasticizer is added and the mixing continued until a uniform, homogeneous product is obtained. The temperature may be raised somewhat above room temperature, if desired, either before or after the addition of the plasticizer to facilitate the colloiding action. This may conveniently be done by using a steam jacketed mixer. A certain amount of heat is also developed within the material itself during the mixing by the friction of the particles rubbing against each other. In many instances it will be found advantageous to add a roll-release agent, such as stearic acid, to the composition before it is put on compounding rolls.

The homogeneous mixture so obtained is then thoroughly compounded on rolls, sheeted out, and the sheets can be stored until required for further processing. If the compounding rolls are feeding directly to fabricating equipment, the curing agent may be added on the rolls and thoroughly incorporated in the composition just prior to fabrication. If the sheeted material has been stored for some time before the addition of the curing agent, the sheets are put on cold compounding rolls and the curing agent incorporated before fabrication. The compounding rolls may be operated at an elevated temperature, which temperature will depend on the particular ingredients and proportions thereof in the composition.

The composition, containing the curing agent, is adapted to be formed by extrusion and injection or compression molding. It can be calendered into free films or on to sheet-base materials. It can be dispersed in certain specific solvents and cast into films or coated on base materials as by spraying, dipping, roller coating, and other like procedures. Laminations of sheet materials such as wood and canvas can be made, either with films or coated sheets of the composition containing the curing agent. After the desired forming or coating operation has been performed, the material can then be converted from the thermoplastic to the infusible state.

The curing is carried out preferably by heating the articles formed from the composition or articles coated therewith. The time and temperature of curing depend upon a number of factors including the proportions and nature of the ingredients. The nature and proportion of the curing agent will usually be more effective in determining the time and temperature of the curing operation than will the other ingredients, although these should be considered. Curing times of from a few minutes to several hours and a curing temperature of from room temperature to about 275° F., preferably from 230° to 260° F., may be employed. In the case of molded articles, the curing may be effected in the mold before the article is removed from the mold, or the article may be removed and subsequently cured, such as by heating in an oven. Although curing may be carried out at atmospheric pressure, it is frequently desirable to maintain a pressure somewhat above atmospheric pressure to prevent the formation in the article of blisters or bubbles, which are presumable due to the vaporization of small amounts of low-boiling materials, e. g. moisture, curing agent, and the like, that may be included in the formed article. Pressures ranging from 1 pound per square inch gauge in the case of oven cured articles, up to 1,000 pounds per square inch in the case of articles cured in the mold, have been used satisfactorily.

The following examples illustrate the practice of my invention in the compounding of the composition; in which the parts given are by weight:

Example 1

A copolymer composed of 85 per cent vinylidene chloride and 15 per cent of acrylonitrile (1,000 parts), a re-enforcing carbon, such as "Thermax" (400 parts), and litharge (40 parts) were put in a jacketed Banbury mixer and stirred for several minutes until uniformly mixed. Thereafter, tributyl aconitate (430 parts), a plasticizer, was added to the batch, atmospheric pressure steam introduced into the jacket of the Banbury, and the batch was stirred until uniformly colloided, which required about 3 hours. The steam was shut off and the mixer watercooled after the first 20 minutes of mixing. Stearic acid (10 parts) was then added to the batch and the mixing continued for about 15 minutes. The mixture was then put on compounding rolls operated at room temperature. The curing agent, pyridine (23.7 parts), was then incorporated with the composition on the rolls during the course of about 15 minutes. Compositions of this type are useful for forming articles by extrusion. Tubing was formed from the composition and cured at 270° F. for 30 minutes under 100 pounds per square inch gauge pressure.

The finished articles had a tensile strength of 2,100 pounds per square inch, an elongation of 210 per cent, a brittle point of −40° C., a hardness of 85 (Shore durometer), and a permanent set of approximately 10 per cent.

By curing the composition (of the above example) at 230° F. for 40 minutes under pressure of 100 pounds per square inch, finished articles exhibiting an elongation of 300 per cent could be obtained.

By increasing the amount of carbon (in Example 1) to 600 parts and decreasing the amount of tributyl aconitate in the composition to 350 parts, with a cure at 240° F. for 80 minutes under 100 pounds pressure, extruded articles having a tensile strength of about 2,500 pounds per square inch can be produced.

Example 2

A composition particularly suitable for use in forming articles by injection molding can be prepared according to Example 1, utilizing 500 parts of dibutyl phthalate as the plasticizer and 17 parts of a 60 per cent aqueous solution of ethylene diamine as the curing agent. The prepared composition was used in making injection molded heels and soles for shoes. This composition was also dispersed in ethylene chloride and used for coating fibrous sheet-base materials by spraying and calendering. The injection molded and coated articles are cured at 250° to 270° F. for 30 minutes.

The injection molded articles produced as above described have a tensile strength of 1,800 pounds per square inch, a brittle point of —50° C., and an elongation of 225 per cent.

*Example 3*

An air-drying coating composition which cures at room temperature may be prepared by forming a composition as in Example 2, using enough of the aqueous solution of ethylene diamine to bring the content of the curing agent up to 35 parts. The composition was dispersed in ethylene chloride and brushed on the surface to be coated. The composition cures in about 24 hours at room temperature and atmospheric pressure.

*Example 4*

The following composition was compounded substantially in accordance with the procedure followed in Example 1: the copolymer was composed of 88 per cent vinylidene chloride and 12 per cent acrylonitrile, 1,000 parts being used; 500 parts of carbon; 30 parts of litharge; 600 parts of diamyl phthalate; 20 parts of palmitic acid; and, 30 parts of ammonium carbonate were used as the curing agent. The composition was used in impregnating canvas fabric for laminations. Compression moldings of this composition, cured at 250° F. for 50 minutes under a pressure of 600 pounds per square inch, gave articles having a tensile strength of 600 pounds per square inch, an elongation of 250 per cent, a permanent set of 15, a hardness of 45, and a brittle point of —60° C.

*Example 5*

A composition was prepared and compounded as in Example 1, utilizing 400 parts of titanium dioxide in lieu of the carbon and 35 parts of a 60 per cent aqueous solution of ethylene diamine was substituted for the pyridine. Compression moldings were prepared from the composition and cured at 270° F. for 45 minutes under a pressure of 100 pounds per square inch. Such molded articles were light ivory in color and had a tensile strength of 1,750 pounds per square inch, an elongation of 280 per cent, a permanent set of 15 per cent, and a hardness of 85.

*Example 6*

A copolymer of 82 per cent vinylidene chloride and 18 per cent acrylonitrile was mixed with re-enforcing carbon and litharge, and mixed in the proportions given in Example 1. There was then added 400 parts of dibutyl phthalate, as a plasticizer, and the batch was stirred for about 30 minutes, until uniform, while exhaust steam (atmospheric pressure) was passed through the jacket of the mixer. After mixing in about 10 parts of stearic acid, the batch was worked on compounding rolls at room temperature, while 20 parts of a butyraldehyde-aniline condensate ("Beutene") was added in the course of 15 minutes. A test sheet of the composition, cured for 15 minutes at 260° F., had a tensile strength of 2400 pounds per square inch, an elongation of 320 per cent, a brittle point of —35° C., a hardness of 50 (durometer A), and a permanent set of 4 per cent.

Depending upon the use to be made of the composition and the properties desired in the finished article, the proportion of plasticizer may be varied from about one-tenth part of plasticizer per part of copolymer to two parts of plasticizer per part of copolymer. The quantity of plasticizer must be sufficient to permit the working of the copolymer and the incorporation of the curing agent without precuring occurring before such action is desired. The maximum amount of plasticizer employed will depend upon the softness and elongation desired in the finished articles. The organic esters of aconitic acid, phosphoric acid, phthalic acid, etc., are suitable for use as plasticizers.

The effect of the plasticizer is to increase or decrease the hardness of the finished cured articles, depending upon the nature and amount of the particular plasticizer employed, and to increase the tensile strength and resilence. In general, the plasticizers have only a limited effect on the elongation, but considerably reduce the permanent set of the finished articles. Many of the plasticizers decrease the solvent resistance of the cured articles and care must be exercised in the selection of the plasticizer, if the finished articles are utilized particularly in an application requiring resistance to specific liquids.

Fillers and pigments may be entirely omitted from the composition or may be employed in amount up to about one part of filler per part of polymer. Mineral fillers such as titanium dioxide, barium sulphate, calcium sulphate, asbestos, organic pigments and natural gums, wood flour, carbon, and other effect modifying agents are useful in re-enforcing and extending the composition. In general, the fillers tend to decrease the tensile strength of finished articles formed from the composition, to increase the hardness thereof and to decrease the elongation. Carbon of certain types such as "Thermax" increases the tensile strength. Some fillers, particularly those of the basic type, may act as accelerators.

An accelerator may be employed up to the amount of one-tenth part thereof per part of polymer. The quantity preferably employed is between about 0.02 and 0.055 part by weight per part of polymer. Litharge is the preferred accelerator, although others, such as small amounts of zinc oxide, may be used. An excess of accelerator is not objectionable, in that it usually serves as a filler or extender.

A roll-release agent or tack reducer can be used in amount up to about 0.015 part per part of polymer. Such agent may be selected from the higher molecular weight fatty acids, of which stearic acid, oleic acid, and palmitic acid are examples. An excess of such agents is not generally desirable in that undue hardness of the composition may result.

It has been found that, in some cases at least, the addition to the above described compositions, prior to curing, of small amounts of sulfur or such sulfur compounds as benzothiazyl disulfide, mercaptobenzothiazole, or tetramethyl or tetraethyl thiuram disulfide, tends to improve the elongation, elasticity and heat stability of the infusible cured composition.

Cured articles formed from the compositions herein described are infusible and their properties vary over a wide range. For example, in hardness they may resemble hard rubber or they may be highly plasticized to produce gel-like substances. Formulations can be prepared yielding elastic bodies which take very little permanent set. A practical cure will give a permanent set of 15 per cent or less, preferably about 4 to 7 per cent. Overcuring is accompanied by low values for permanent set (0-2) and by decreases in the tensile strength and elongation of the product. Injection molded articles do not cold flow and exhibit no brittleness at temperatures at least as low as $-35°$ C. Because of this excellent cold resistance, the composition makes a very good material for cable covering, the power factor being low and the dielectric constant relatively high.

The cured material exhibits the high solvent resistance to most chemicals characteristic of the normally crystalline vinylidene halide polymers and copolymers, although it is essentially amorphous upon X-ray examination. It resists particularly the action of aromatics, such as benzene, toluene etc., and aliphatic hydrocarbons. Organic ethers, esters, and ketones generally do not affect it greatly; carbon disulphide, and inorganic acids and alkalies do not even produce swelling of the material. Carbon tetrachloride has substantially not effect upon the composition, but ethylene and propylene chlorides swell the material to some extent. Naturally, the plasticizer and filler employed in compounding the material must be chosen with a view toward the ultimate use, in the event contact with solvents is anticipated, as in tubing, pipe and fittings, coverings for plating racks, sheet coatings, and free films used in certain packaging fields.

This application is a continuation-in-part of my copending application Serial No. 509,762 filed November 10, 1943.

I claim:

1. A thermoplastic composition, capable of being shaped and cured thermally to provide infusible, strong articles, consisting essentially of: a normally thermoplastic vinylidene chloride acrylonitrile copolymer consisting of from 82 to 88 per cent vinylidene chloride and complementarily between 12 and 18 per cent of copolymerized acrylonitrile, between 0.1 and 2.0 parts by weight of a plasticizer per part of said copolymer, up to 1.0 part of a filler per part of copolymer, and between 0.06 and 0.01 part of a basic nitrogen compound, having a dissociation constant between $10^{-10}$ and $10^{-3}$, per part of copolymer.

2. The method of converting a normally thermoplastic vinylidene chloride acrylonitrile copolymer consisting of from 82 to 88 per cent vinylidene chloride and complementarily between 12 and 18 per cent of copolymerized acrylonitrile, to an infusible state which includes the steps of: plasticizing said copolymer, incorporating a basic nitrogen compound, having a dissociation constant between $10^{-10}$ and $10^{-3}$ in the plasticized copolymer, and heating the mixture to a temperature between about 240° F. and about 275° F. for a time sufficient to convert the copolymer to an infusible state.

3. The composition claimed in claim 1, wherein the basic nitrogen compound is ethylene diamine.

4. The composition claimed in claim 1, wherein the basic nitrogen compound is ammonium carbonate.

5. The composition claimed in claim 1, wherein the basic nitrogen compound is a condensate of butyraldehyde and aniline.

6. An infusible, plasticized composition prepared by the method of claim 2.

JOHN H. REILLY.

REFERENCES CITED

The following references are of record in the file of this patent:

UNITED STATES PATENTS

| Number | Name | Date |
|---|---|---|
| 2,117,591 | Alexander | May 17, 1938 |
| 2,238,020 | Hanson et al. | Apr. 8, 1941 |
| 2,278,415 | Arnold | Apr. 7, 1942 |
| 2,304,637 | Hardy | Dec. 8, 1942 |
| 2,405,008 | Berry et al. | July 30, 1946 |
| 2,451,174 | Reuter | Oct. 12, 1948 |